(12) United States Patent
Zheng et al.

(10) Patent No.: US 12,253,991 B2
(45) Date of Patent: Mar. 18, 2025

(54) SYSTEM, METHOD, AND COMPUTER PROGRAM PRODUCT FOR FEATURE ANALYSIS USING AN EMBEDDING TREE

(71) Applicant: Visa International Service Association, San Francisco, CA (US)

(72) Inventors: Yan Zheng, Los Gatos, CA (US); Wei Zhang, Fremont, CA (US); Michael Yeh, Newark, CA (US); Liang Wang, San Jose, CA (US); Junpeng Wang, Santa Clara, CA (US); Shubham Jain, Mountain View, CA (US); Zhongfang Zhuang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/280,828

(22) PCT Filed: Jun. 9, 2022

(86) PCT No.: PCT/US2022/032863
§ 371 (c)(1),
(2) Date: Sep. 7, 2023

(87) PCT Pub. No.: WO2022/261345
PCT Pub. Date: Dec. 15, 2022

(65) Prior Publication Data
US 2024/0152499 A1 May 9, 2024

Related U.S. Application Data

(60) Provisional application No. 63/209,113, filed on Jun. 10, 2021.

(51) Int. Cl.
*G06F 16/00* (2019.01)
*G06F 16/22* (2019.01)

(52) U.S. Cl.
CPC .............. *G06F 16/2246* (2019.01)

(58) Field of Classification Search
CPC ................................. G06F 16/2246
(Continued)

(56) References Cited

U.S. PATENT DOCUMENTS 10,719,666 B1 * 7/2020 Walters ............ G06N 3/08
2007/0094060 A1 4/2007 Apps et al.
(Continued)

FOREIGN PATENT DOCUMENTS

| CN | 112233798 B | 3/2021 |
| WO | 2021046551 A1 | 3/2021 |
| WO | 2021077585 A1 | 4/2021 |

OTHER PUBLICATIONS

Camacho-Collados et al., "From Word to Sense Embeddings: A Survey on Vector Representations of Meaning", Journal of Artificial Intelligence Research 63, 2018, pp. 743-788.
(Continued)

*Primary Examiner* — Michelle N Owyang
(74) *Attorney, Agent, or Firm* — The Webb Law Firm

(57) ABSTRACT

Provided is a system for analyzing features associated with entities using an embedding tree, the system including at least one processor programmed or configured to receive a dataset associated with a plurality of entities, wherein the dataset comprises a plurality of data instances for a plurality of entities. The processor may be programmed or configured to generate at least two embeddings based on the dataset and determine split criteria for partitioning an embedding space of at least one embedding tree associated with the dataset based on feature data associated with an entity and embedding data associated with the at least two embeddings. The processor may be programmed or configured to generate at least one embedding tree having a plurality of nodes based
(Continued)

on the split criteria. Methods and computer program products are also provided.

20 Claims, 12 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 2014/0108324 A1* | 4/2014 | Chen ..................... | G06F 17/16 706/52 |
| 2020/0067969 A1* | 2/2020 | Abbaszadeh ............ | G06N 5/04 |
| 2020/0250234 A1* | 8/2020 | Teofili .................. | G06F 16/9024 |
| 2021/0103925 A1 | 4/2021 | Dev et al. | |
| 2021/0303638 A1* | 9/2021 | Zhong ................... | G06F 40/169 |
| 2022/0383145 A1* | 12/2022 | Sen ......................... | G06N 3/045 |

OTHER PUBLICATIONS

Du et al., "Pcard: Personalized Restaurants Recommendation from Card Payment Transaction Records", International World Web Conference Committee, 2019, pp. 2687-2693.
Grbovic et al., "E-Commerce in Your Inbox: Product Recommendations at Scale", ACM, International Conference on Knowledge Discovery and Data Mining, 2016, pp. 1-10.
Harris, "Distributional Structure", Word, 1954, pp. 146-162, vol. 10, No. 2-3.
Levy et al., "Neural Word Embedding as Implicit Matrix Factorization", Advances in Neural Information Processing Systems 27, 2014, pp. 1-9.
Liu et al., "An Embedded Feature Selection Method for Imbalanced Data Classification", IEEE, CAA Journal of Automatic Sinica, 2019, pp. 1-13.
Mikolov et al., "Distributed Representations of Words and Phrases and their Compositionality", Advances in Neural Information Processing Systems, 2013, pp. 1-9.
Mikilov et al., "Efficient Estimation of Word Representations in Vector Space", 2013, pp. 1-12.
Pennington et al., "GloVe: Global Vectors for Word Representations", Proceedings of the 2014 Conference on Empirical Methods in Natural Language Processing (EMNLP), 2014, pp. 1532-1543.
Perozzi et al., "DeepWalk: Online Learning of Social Representations", KDD'14, Proceedings of the 20th ACM SIGKDD International Conference on Knowledge Discovery and Data Mining, 2014, pp. 1-10.
Qui et al., "Network Embedding as Matrix Factorization: Unifying DeepWalk, Line, PTE, and node2vec", WSDM'18, 2018, pp. 1-9.
Shi et al., "Unsupervised Learning with Random Forest Predictors", Journal of Computational and Graphical Statistics, 2005, pp. 1-38.
Turrin et al., "30Music Listening and Playlists Dataset", RecSys 2015 Poster Proceedings, 2015, pp. 1-2.
Vasile et al., "Meta-Prod2Vec—Product Embeddings Using Side-Information for Recommendation", RecSys'16, 2016, pp. 1-8.
Wang et al., "Community Preserving Network Embedding", Proceedings of the Thirty-First AAAI Conference on Artificial Intelligence (AAAI-17), 2017, pp. 203-209.
Wei et al., "Cross View Link Prediction by Learning Noise-Resilient Representation Consensus", International World Wide Web Conference Committee (IW3C2), 2017, pp. 1611-1619.
Yeh et al., "Towards a Flexible Embedding Learning Framework", 2020, pp. 1-10.
Zhou et al., "Scalable Graph Embedding for Asymmetric Proximity", Proceedings of the Thirty-First AAAI Conference on Artificial Intelligence (AAAI-17), pp. 2942-2948.

* cited by examiner $$\hat{w}_1 = \frac{s}{N}$$

$$\hat{u}_1 = \frac{1}{s}\sum_{f_i=0} x_i$$

$$\hat{\sigma}_1 = \frac{1}{s}\sum_{f_i=0} \|x_i - \hat{u}_1\|^2$$

400

Embedding Analysis System
102

418
Determine, for each of the first group and the second group, a measure of a prior probability distribution, $w$, a measure of a mean, $u$, and a measure of a standard deviation, $\sigma$ $$\hat{L}_s = -\frac{s}{2}\log 2\hat{w}_1\hat{\sigma}_1^2 - \frac{N-s}{2}\log 2\hat{w}_2\hat{\sigma}_2^2 + s\log\hat{w}_1 + (N-s)\log\hat{w}_2.$$

400

Embedding Analysis System
102

420
Determine the log likelihood, Ls, for an embedding, s

SYSTEM, METHOD, AND COMPUTER PROGRAM PRODUCT FOR FEATURE ANALYSIS USING AN EMBEDDING TREE

CROSS-REFERENCE TO RELATED APPLICATIONS

This application is the United States national phase of International Application No. PCT/US2022/032863 filed Jun. 9, 2022, and claims priority to U.S. Provisional Patent Application No. 63/209,113 filed on Jun. 10, 2021, the disclosures of which are hereby incorporated by reference in their entirety.

BACKGROUND

1. Technical Field

The present disclosure relates generally to systems, devices, products, apparatus, and methods for feature analysis and, in one particular embodiment, to a system, product, and method for feature analysis using an embedding tree.

2. Technical Considerations

An embedding (e.g., a neural embedding) may refer to a relatively low-dimensional space into which high-dimensional vectors, such as feature vectors, can be translated. In some examples, the embedding may include a vector that has values which represent relationships of the semantics and the syntactic of inputs by placing semantically similar inputs closer together in an embedding space. In some instances, embeddings may improve the performance of machine learning techniques on large inputs, such as sparse vectors representing words. For example, embeddings may be learned and reused across machine learning models.

In some instances, embeddings may be used to learn information from a dataset. However, in some instances, operations may need to be performed before embeddings may be used to learn the information from the dataset. For example, a pseudo-document and/or a graph may be required to be generated on top of the dataset before an embedding can be used to learn information from the dataset. Further, it may be difficult to determine information about the feature values of a feature vector that an embedding embeds.

SUMMARY

Accordingly, systems, devices, products, apparatus, and/or methods for analyzing features associated with entities using an embedding tree are disclosed.

According to some non-limiting embodiments or aspects, provided is a system for analyzing features associated with entities using an embedding tree. In some non-limiting embodiments or aspects, the system may comprise at least one processor programmed or configured to receive a dataset associated with a plurality of entities, wherein the dataset comprises a plurality of data instances for a plurality of entities, wherein each data instance comprises feature data associated with an entity, and wherein the feature data comprises a plurality of feature values of a plurality of features for the entity. In some non-limiting embodiments or aspects, the at least one processor may be further programmed or configured to generate at least two embeddings based on the dataset associated with the plurality of entities, wherein the at least two embeddings comprises embedding data associated with the at least two embeddings, and wherein the embedding data comprises values of embedding vectors of the at least two embeddings. In some non-limiting embodiments or aspects, the at least one processor may be further programmed or configured to determine split criteria for partitioning an embedding space of at least one embedding tree associated with the dataset based on the feature data associated with an entity and the embedding data associated with the at least two embeddings. In some non-limiting embodiments or aspects, the at least one processor is further programmed or configured to generate the at least one embedding tree having a plurality of nodes based on the split criteria.

In some non-limiting embodiments or aspects, the at least one processor is further programmed or configured to perform an anomaly detection process based on the embedding tree.

In some non-limiting embodiments or aspects, the at least one processor is further programmed or configured to generate an embedding for a first entity based on the at least one embedding tree.

In some non-limiting embodiments or aspects, when determining split criteria for partitioning the embedding space of the at least one embedding tree associated with the dataset, the at least one processor is programmed or configured to determine a Bayesian Information Criterion (BIC) score for a feature associated with a Gaussian mixture model under the embedding data.

In some non-limiting embodiments or aspects, when determining the BIC score for a feature associated with a Gaussian mixture model under the embedding data, the at least one processor is programmed or configured to for each feature of the plurality of features for the entity assign each feature having a value equal to 1 to a first group and assign each feature having a value equal to 0 to a second group; determine a measure of a prior probability distribution, a measure of a mean, and a measure of a standard deviation for each of the first group and the second group using a maximum likelihood estimation (MLE) function; and determine the BIC score based on the prior probability distribution, the measure of a mean, and the measure of a standard deviation for the first group and the prior probability distribution, the measure of a mean, and the measure of a standard deviation for the second group.

In some non-limiting embodiments or aspects, the at least one processor is further programmed or configured to display a graphical representation of the at least one embedding tree, wherein the graphical representation comprises a plurality of graphical user interface (GUI) elements associated with the plurality of nodes of the at least one embedding tree, and wherein each node of the at least one embedding tree comprises a GUI element.

In some non-limiting embodiments or aspects, wherein the split criteria comprises a feature of the plurality of features, and wherein, when determining the split criteria for partitioning the embedding space of the at least one embedding tree associated with the dataset, the at least one processor is programmed or configured to determine the feature of the plurality of features for partitioning the embedding space of the at least one embedding tree associated with the dataset.

According to some non-limiting embodiments or aspects, provided is a method for analyzing features associated with entities using an embedding tree. In some non-limiting embodiments or aspects, the method may comprise receiving, by at least one processor, a dataset associated with a plurality of entities, wherein the dataset comprises a plurality of data instances for a plurality of entities, wherein each data instance comprises feature data associated with an entity, and wherein the feature data comprises a plurality of feature values of a plurality of features for the entity. In some non-limiting embodiments or aspects, the method may further comprise generating, by the at least one processor, at least two embeddings based on the dataset associated with the plurality of entities, wherein the at least two embeddings comprises embedding data associated with the at least two embeddings, and wherein the embedding data comprises values of embedding vectors of the at least two embeddings. In some non-limiting embodiments or aspects, the method may further comprise determining, by the at least one processor, split criteria for partitioning an embedding space of at least one embedding tree associated with the dataset based on the feature data associated with an entity and the embedding data associated with the at least two embeddings. In some non-limiting embodiments or aspects, the method may further comprise generating, by the at least one processor, the at least one embedding tree having a plurality of nodes based on the split criteria.

In some non-limiting embodiments or aspects, the method may further comprise performing, by the at least one processor, an anomaly detection process based on the embedding tree.

In some non-limiting embodiments or aspects, the method may further comprise generating, by the at least one processor, an embedding for a first entity based on the at least one embedding tree.

In some non-limiting embodiments or aspects, determining split criteria for partitioning the embedding space of the at least one embedding tree associated with the dataset may comprise determining a Bayesian Information Criterion (BIC) score for a feature associated with a Gaussian mixture model under the embedding data.

In some non-limiting embodiments or aspects, determining the BIC score for a feature associated with a Gaussian mixture model under the embedding data may comprise, for each feature of the plurality of features for the entity, assigning each feature having a value equal to 1 to a first group and assigning each feature having a value equal to 0 to a second group; determining a measure of a prior probability distribution, a measure of a mean, and a measure of a standard deviation for each of the first group and the second group using a maximum likelihood estimation (MLE) function; and determining the BIC score based on the prior probability distribution, the measure of a mean, and the measure of a standard deviation for the first group and the prior probability distribution, the measure of a mean, and the measure of a standard deviation for the second group.

In some non-limiting embodiments or aspects, the method may further comprise displaying, by the at least one processor, a graphical representation of the at least one embedding tree, wherein the graphical representation comprises a plurality of GUI elements associated with the plurality of nodes of the at least one embedding tree, and wherein each node of the at least one embedding tree comprises a GUI element.

In some non-limiting embodiments or aspects, wherein the split criteria comprises a feature of the plurality of features, and wherein determining the split criteria for partitioning the embedding space of the at least one embedding tree associated with the dataset may comprise determining the feature of the plurality of features for partitioning the embedding space of the at least one embedding tree associated with the dataset.

According to some non-limiting embodiments or aspects, provided is a computer program product for analyzing features associated with entities using an embedding tree. n some non-limiting embodiments or aspects, the computer program product may comprise at least one non-transitory computer-readable medium including one or more instructions that, when executed by at least one processor, cause the at least one processor to: receive a dataset associated with a plurality of entities, wherein the dataset comprises a plurality of data instances for a plurality of entities, wherein each data instance comprises feature data associated with an entity, and wherein the feature data comprises a plurality of feature values of a plurality of features for the entity. In some non-limiting embodiments or aspects, the one or more instructions may further cause the at least one processor to generate at least two embeddings based on the dataset associated with the plurality of entities, wherein the at least two embeddings comprises embedding data associated with the at least two embeddings, and wherein the embedding data comprises values of embedding vectors of the at least two embeddings. In some non-limiting embodiments or aspects, the one or more instructions may further cause the at least one processor to determine split criteria for partitioning an embedding space of at least one embedding tree associated with the dataset based on the feature data associated with an entity and the embedding data associated with the at least two embeddings. In some non-limiting embodiments or aspects, the one or more instructions may further cause the at least one processor to generate the at least one embedding tree having a plurality of nodes based on the split criteria.

In some non-limiting embodiments or aspects, the one or more instructions may further cause the at least one processor to perform an anomaly detection process based on the embedding tree.

In some non-limiting embodiments or aspects, the one or more instructions may further cause the at least one processor to generate an embedding for a first entity based on the at least one embedding tree.

In some non-limiting embodiments or aspects, wherein, when determining split criteria for partitioning the embedding space of the at least one embedding tree associated with the dataset, the one or more instructions may cause the at least one processor to determine a Bayesian Information Criterion (BIC) score for a feature associated with a Gaussian mixture model under the embedding data.

In some non-limiting embodiments or aspects, wherein, when determining the BIC score for a feature associated with a Gaussian mixture model under the embedding data, the one or more instructions may cause the at least one processor to, for each feature of the plurality of features for the entity, assign each feature having a value equal to 1 to a first group and assign each feature having a value equal to 0 to a second group; determine a measure of a prior probability distribution, a measure of a mean, and a measure of a standard deviation for each of the first group and the second group using a maximum likelihood estimation (MLE) function; and determine the BIC score based on the prior probability distribution, the measure of a mean, and the measure of a standard deviation for the first group and the prior probability distribution, the measure of a mean, and the measure of a standard deviation for the second group; In some non-limiting embodiments or aspects, wherein the split criteria comprises a feature of the plurality of features, and wherein, when determining the split criteria for partitioning the embedding space of the at least one embedding tree associated with the dataset, the one or more instructions may further cause the at least one processor to determine the feature of the plurality of features for partitioning the embedding space of the at least one embedding tree associated with the dataset.

In some non-limiting embodiments or aspects, the one or more instructions may further cause the at least one processor to display a graphical representation of the at least one embedding tree, wherein the graphical representation comprises a plurality of GUI elements associated with the plurality of nodes of the at least one embedding tree, and wherein each node of the at least one embedding tree comprises a GUI element.

Further non-limiting embodiments or aspects are set forth in the following numbered clauses:

Clause 1: A system for analyzing features associated with entities using an embedding tree, the system comprising: at least one processor programmed or configured to: receive a dataset associated with a plurality of entities, wherein the dataset comprises a plurality of data instances for a plurality of entities, wherein each data instance comprises feature data associated with an entity, and wherein the feature data comprises a plurality of feature values of a plurality of features for the entity; generate at least two embeddings based on the dataset associated with the plurality of entities, wherein the at least two embeddings comprises embedding data associated with the at least two embeddings, and wherein the embedding data comprises values of embedding vectors of the at least two embeddings; determine split criteria for partitioning an embedding space of at least one embedding tree associated with the dataset based on the feature data associated with an entity and the embedding data associated with the at least two embeddings; and generate the at least one embedding tree having a plurality of nodes based on the split criteria.

Clause 2: The system of clause 1, wherein the at least one processor is further programmed or configured to: perform an anomaly detection process based on the embedding tree.

Clause 3: The system of clause 1 or clause 2, wherein the at least one processor is further programmed or configured to: generate an embedding for a first entity based on the at least one embedding tree.

Clause 4: The system of any of clauses 1-3, wherein, when determining split criteria for partitioning the embedding space of the at least one embedding tree associated with the dataset, the at least one processor is programmed or configured to: determine a Bayesian Information Criterion (BIC) score for a feature associated with a Gaussian mixture model under the embedding data.

Clause 5: The system of any of clauses 1-4, wherein, when determining the BIC score for a feature associated with a Gaussian mixture model under the embedding data, the at least one processor is programmed or configured to: for each feature of the plurality of features for the entity: assign each feature having a value equal to 1 to a first group and assign each feature having a value equal to 0 to a second group; determine a measure of a prior probability distribution, a measure of a mean, and a measure of a standard deviation for each of the first group and the second group using a maximum likelihood estimation (MLE) function; and determine the BIC score based on the prior probability distribution, the measure of a mean, and the measure of a standard deviation for the first group and the prior probability distribution, the measure of a mean, and the measure of a standard deviation for the second group.

Clause 6: The system of any of clauses 1-5, wherein the at least one processor is further programmed or configured to: display a graphical representation of the at least one embedding tree, wherein the graphical representation comprises a plurality of graphical user interface elements associated with the plurality of nodes of the at least one embedding tree, and wherein each node of the at least one embedding tree comprises a graphical user interface element.

Clause 7: The system of any of clauses 1-6, wherein the split criteria comprises a feature of the plurality of features, and wherein, when determining the split criteria for partitioning the embedding space of the at least one embedding tree associated with the dataset, the at least one processor is programmed or configured to: determine the feature of the plurality of features for partitioning the embedding space of the at least one embedding tree associated with the dataset.

Clause 8: A method for analyzing features associated with entities using an embedding tree, the method comprising: receiving, by at least one processor, a dataset associated with a plurality of entities, wherein the dataset comprises a plurality of data instances for a plurality of entities, wherein each data instance comprises feature data associated with an entity, and wherein the feature data comprises a plurality of feature values of a plurality of features for the entity; generating, by the at least one processor, at least two embeddings based on the dataset associated with the plurality of entities, wherein the at least two embeddings comprises embedding data associated with the at least two embeddings, and wherein the embedding data comprises values of embedding vectors of the at least two embeddings; determining, by the at least one processor, split criteria for partitioning an embedding space of at least one embedding tree associated with the dataset based on the feature data associated with an entity and the embedding data associated with the at least two embeddings; and generating, by the at least one processor, the at least one embedding tree having a plurality of nodes based on the split criteria.

Clause 9: The method of clause 8, further comprising: performing, by the at least one processor, an anomaly detection process based on the embedding tree.

Clause 10: The method of clause 8 or clause 9, further comprising: generating, by the at least one processor, an embedding for a first entity based on the at least one embedding tree.

Clause 11: The method of any of clauses 8-10, wherein determining split criteria for partitioning the embedding space of the at least one embedding tree associated with the dataset comprises: determining a Bayesian Information Criterion (BIC) score for a feature associated with a Gaussian mixture model under the embedding data.

Clause 12: The method of any of clauses 8-11, wherein determining the BIC score for a feature associated with a Gaussian mixture model under the embedding data comprises: for each feature of the plurality of features for the entity: assigning each feature having a value equal to 1 to a first group and assigning each feature having a value equal to 0 to a second group; determining a measure of a prior probability distribution, a measure of a mean, and a measure of a standard deviation for each of the first group and the second group using a maximum likelihood estimation (MLE) function; and determining the BIC score based on the prior probability distribution, the measure of a mean, and the measure of a standard deviation for the first group and the prior probability distribution, the measure of a mean, and the measure of a standard deviation for the second group.

Clause 13: The method of any of clauses 8-12, further comprising: displaying, by the at least one processor, a graphical representation of the at least one embedding tree, wherein the graphical representation comprises a plurality of graphical user interface elements associated with the plurality of nodes of the at least one embedding tree, and wherein each node of the at least one embedding tree comprises a graphical user interface element.

Clause 14: The method of any of clauses 8-13, wherein the split criteria comprises a feature of the plurality of features, and wherein determining the split criteria for partitioning the embedding space of the at least one embedding tree associated with the dataset comprises: determining the feature of the plurality of features for partitioning the embedding space of the at least one embedding tree associated with the dataset.

Clause 15: A computer program product for analyzing features associated with entities using an embedding tree, the computer program product comprising at least one non-transitory computer-readable medium including one or more instructions that, when executed by at least one processor, cause the at least one processor to: receive a dataset associated with a plurality of entities, wherein the dataset comprises a plurality of data instances for a plurality of entities, wherein each data instance comprises feature data associated with an entity, and wherein the feature data comprises a plurality of feature values of a plurality of features for the entity; generate at least two embeddings based on the dataset associated with the plurality of entities, wherein the at least two embeddings comprises embedding data associated with the at least two embeddings, and wherein the embedding data comprises values of embedding vectors of the at least two embeddings; determine split criteria for partitioning an embedding space of at least one embedding tree associated with the dataset based on the feature data associated with an entity and the embedding data associated with the at least two embeddings; and generate the at least one embedding tree having a plurality of nodes based on the split criteria.

Clause 16: The computer program product of clause 15, wherein the one or more instructions cause the at least one processor to: perform an anomaly detection process based on the embedding tree.

Clause 17: The computer program product of clause 15 or clause 16, wherein the one or more instructions cause the at least one processor to: generate an embedding for a first entity based on the at least one embedding tree.

Clause 18: The computer program product of any of clauses 15-17, wherein, when determining split criteria for partitioning the embedding space of the at least one embedding tree associated with the dataset, the one or more instructions cause the at least one processor to: determine a Bayesian Information Criterion (BIC) score for a feature associated with a Gaussian mixture model under the embedding data.

Clause 19: The computer program product of any of clauses 15-18, wherein, when determining the BIC score for a feature associated with a Gaussian mixture model under the embedding data, the one or more instructions cause the at least one processor to: for each feature of the plurality of features for the entity: assign each feature having a value equal to 1 to a first group and assign each feature having a value equal to 0 to a second group; determine a measure of a prior probability distribution, a measure of a mean, and a measure of a standard deviation for each of the first group and the second group using a maximum likelihood estimation (MLE) function; and determine the BIC score based on the prior probability distribution, the measure of a mean, and the measure of a standard deviation for the first group and the prior probability distribution, the measure of a mean, and the measure of a standard deviation for the second group; wherein the split criteria comprises a feature of the plurality of features, and wherein, when determining the split criteria for partitioning the embedding space of the at least one embedding tree associated with the dataset, the one or more instructions case the at least one processor to: determine the feature of the plurality of features for partitioning the embedding space of the at least one embedding tree associated with the dataset.

Clause 20: The computer program product of any of clauses 15-19, wherein the one or more instructions further cause the at least one processor to: display a graphical representation of the at least one embedding tree, wherein the graphical representation comprises a plurality of graphical user interface elements associated with the plurality of nodes of the at least one embedding tree, and wherein each node of the at least one embedding tree comprises a graphical user interface element.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
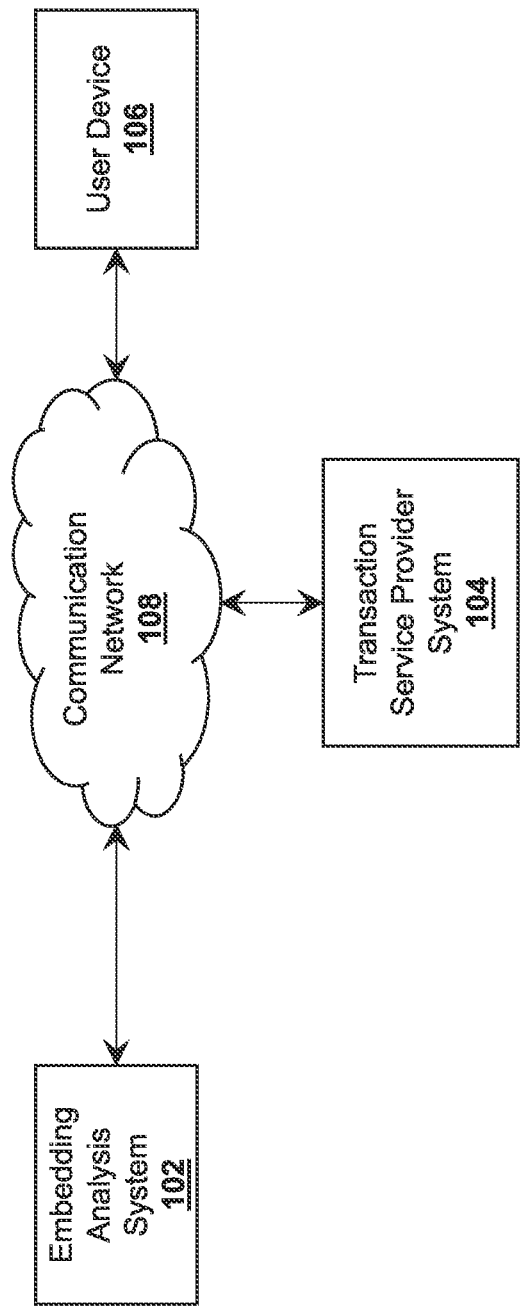
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phrase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor the compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for analyzing features associated with entities using an embedding tree. In some non-limiting embodiments or aspects, an embedding analysis system may include at least one processor programmed or configured to receive a dataset associated with a plurality of entities, wherein the dataset comprises a plurality of data instances for a plurality of entities, wherein each data instance comprises feature data associated with an entity, and wherein the feature data comprises a plurality of feature values of a plurality of features for the entity, generate at least two embeddings based on the dataset associated with the plurality of entities, wherein the at least two embeddings comprises embedding data associated with the at least two embeddings, and wherein the embedding data comprises values of embedding vectors of the at least two embeddings, determine split criteria for partitioning an embedding space of at least one embedding tree associated with the dataset based on the feature data associated with an entity and the embedding data associated with the at least two embeddings, and generate the at least one embedding tree having a plurality of nodes based on the split criteria. In some non-limiting embodiments or aspects, the at least one processor is further programmed or configured to perform an anomaly detection process based on the embedding tree. In some non-limiting embodiments or aspects, the at least one processor is further programmed or configured to generate an embedding for a first entity based on the at least one embedding tree. In some non-limiting embodiments or aspects, when determining split criteria for partitioning the embedding space of the at least one embedding tree associated with the dataset, the at least one processor is programmed or configured to determine a Bayesian Information Criterion (BIC) score for a feature associated with a Gaussian mixture model under the embedding data.

In some non-limiting embodiments or aspects, when determining the BIC score for a feature associated with a Gaussian mixture model under the embedding data, the at least one processor is programmed or configured to, for each feature of the plurality of features for the entity, assign each feature having a value equal to 1 to a first group and assign each feature having a value equal to 0 to a second group, determine a measure of a prior probability distribution, a measure of a mean, and a measure of a standard deviation for each of the first group and the second group using a maximum likelihood estimation (MLE) function, and determine the BIC score based on the prior probability distribution, the measure of a mean, and the measure of a standard deviation for the first group and the prior probability distribution, the measure of a mean, and the measure of a standard deviation for the second group. In some non-limiting embodiments or aspects, wherein the at least one processor is further programmed or configured to display a graphical representation of the at least one embedding tree, wherein the graphical representation comprises a plurality of graphical user interface elements associated with the plurality of nodes of the at least one embedding tree, and wherein each node of the at least one embedding tree comprises a graphical user interface element. In some non-limiting embodiments or aspects, the split criteria comprises a feature of the plurality of features, and when determining the split criteria for partitioning the embedding space of the at least one embedding tree associated with the dataset, the at least one processor is programmed or configured to determine the feature of the plurality of features for partitioning the embedding space of the at least one embedding tree associated with the dataset.

In this way, the embedding analysis system may allow for the use of embeddings to learn information from a dataset without performing initial operations on the dataset. Additionally, the embedding analysis system may allow for the determination of information about feature values of a feature vector that an embedding embeds. Further, the embedding analysis system may be used to find the best embedding clusters based on feature data and new embeddings may be obtained by statistical information of the embedding clusters (e.g., mean or median).

Referring now to FIG. 1, FIG. 1 is a diagram of an example environment 100 in which devices, systems, and/or methods, described herein, may be implemented. As shown in FIG. 1, environment 100 includes embedding analysis system 102, transaction service provider system 104, user device 106, and communication network 108. Embedding analysis system 102, transaction service provider system 104, and/or user device 106 may interconnect (e.g., establish a connection to communicate) via wired connections, wireless connections, or a combination of wired and wireless connections.

Embedding analysis system 102 may include one or more devices configured to communicate with transaction service provider system 104 and/or user device 106 via communication network 108. For example, embedding analysis system 102 may include a server, a group of servers, and/or other like devices. In some non-limiting embodiments or aspects, embedding analysis system 102 may be associated with a transaction service provider system, as described herein. Additionally or alternatively, embedding analysis system 102 may generate (e.g., train, validate, retrain, and/or the like), store, and/or implement (e.g., operate, provide inputs to and/or outputs from, and/or the like) one or more machine learning models. In some non-limiting embodiments or aspects, embedding analysis system 102 may be in communication with a data storage device, which may be local or remote to embedding analysis system 102. In some non-limiting embodiments or aspects, embedding analysis system 102 may be capable of receiving information from, storing information in, transmitting information to, and/or searching information stored in the data storage device.

Transaction service provider system 104 may include one or more devices configured to communicate with embedding analysis system 102 and/or user device 106 via communication network 108. For example, transaction service provider system 104 may include a computing device, such as a server, a group of servers, and/or other like devices. In some non-limiting embodiments or aspects, transaction service provider system 104 may be associated with a transaction service provider system as discussed herein. In some non-limiting embodiments or aspects, the embedding analysis system may be a component of transaction service provider system 104.

User device 106 may include a computing device configured to communicate with embedding analysis system 102 and/or transaction service provider system 104 via communication network 108. For example, user device 106 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, user device 106 may be associated with a user (e.g., an individual operating user device 106).

Communication network 108 may include one or more wired and/or wireless networks. For example, communication network 108 may include a cellular network (e.g., a long-term evolution (LTE®) network, a third-generation (3G) network, a fourth-generation (4G) network, a fifth-generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
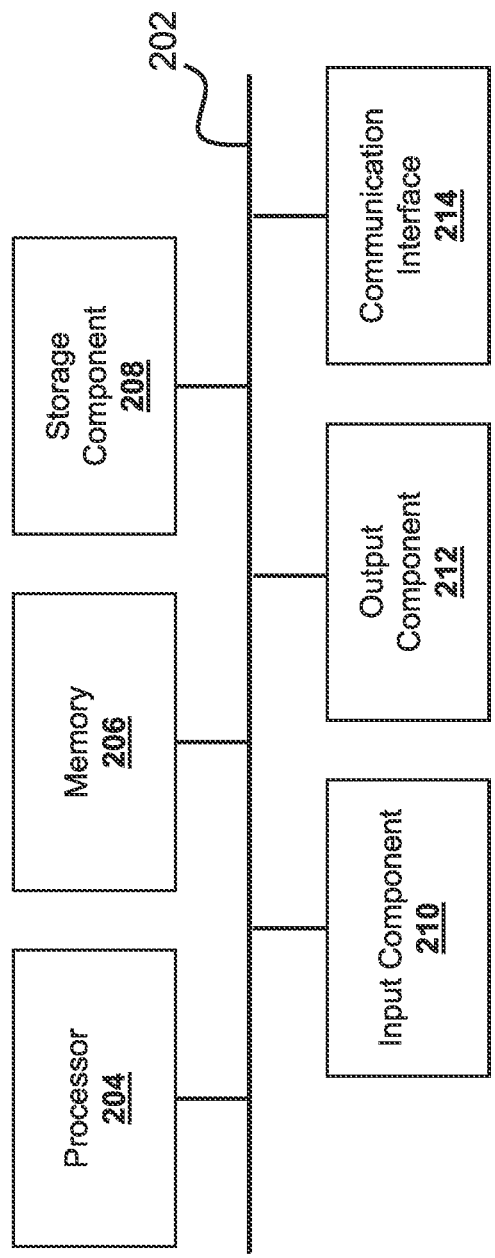
FIG. 2 is a diagram of a non-limiting embodiment or aspect of components of one or more devices of FIG. 1.

Referring now to FIG. 2, FIG. 2 is a diagram of example components of a device 200. Device 200 may correspond to embedding analysis system 102 (e.g., one or more devices of embedding analysis system 102), transaction service provider system 104 (e.g., one or more devices of transaction service provider system 104), and/or user device 106. In some non-limiting embodiments or aspects, embedding analysis system 102, transaction service provider system 104, and/or user device 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
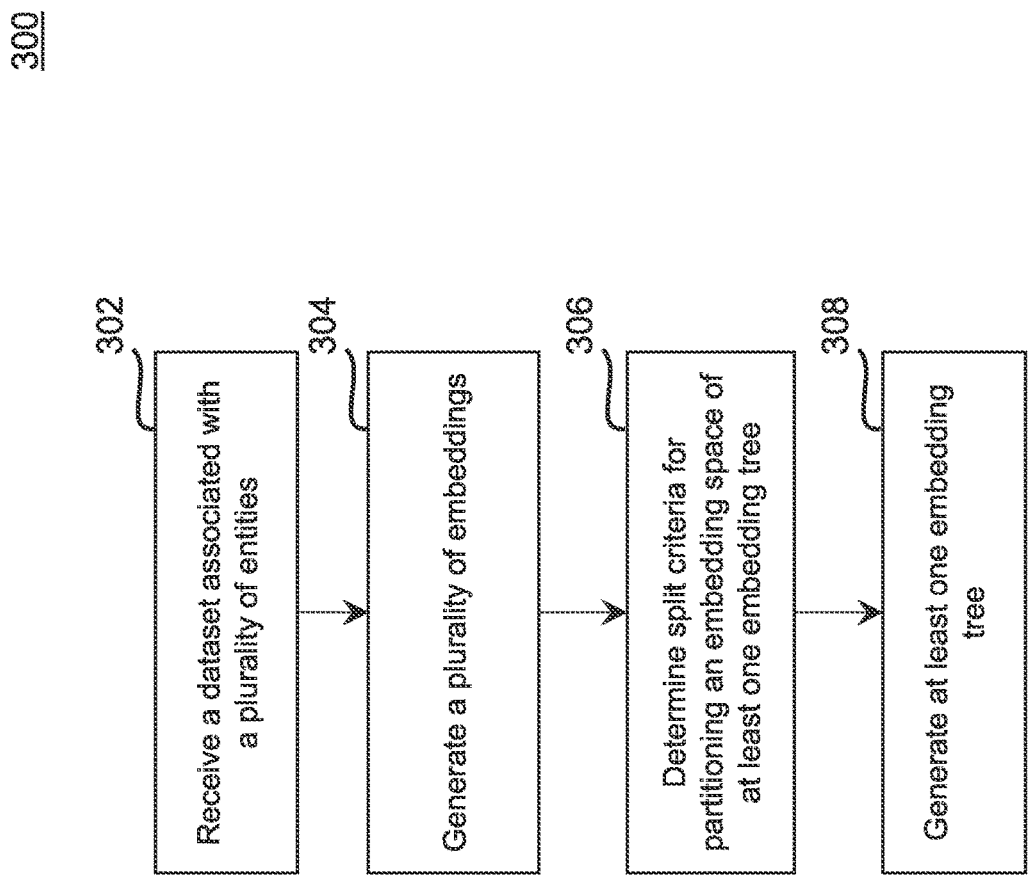
FIG. 3 is a flowchart of a non-limiting embodiment or aspect of a process for analyzing features associated with entities using an embedding tree.

Referring now to FIG. 3, FIG. 3 is a flowchart of a non-limiting embodiment or aspect of a process 300 for analyzing features associated with entities using an embedding tree. In some non-limiting embodiments or aspects, one or more of the steps of process 300 may be performed (e.g., completely, partially, etc.) by embedding analysis system 102 (e.g., one or more devices of embedding analysis system 102). In some non-limiting embodiments or aspects, one or more of the steps of process 300 may be performed (e.g., completely, partially, etc.) by another device or a group of devices separate from or including embedding analysis system 102 (e.g., one or more devices of embedding analysis system 102), transaction service provider system 104 (e.g., one or more devices of transaction service provider system 104), and/or user device 106.

As shown in FIG. 3, at step 302, process 300 includes receiving a dataset associated with a plurality of entities. For example, embedding analysis system 102 may receive the dataset associated with the plurality of entities (e.g., a plurality of merchants) from transaction service provider system 104. In some non-limiting embodiments or aspects, the dataset may include a plurality of data instances for the plurality of entities. Each data instance may include feature data associated with an entity and the feature data may include a plurality of feature values of a plurality of features for the entity.

As shown in FIG. 3, at step 304, process 300 includes generating a plurality of embeddings. For example, embedding analysis system 102 may generate at least two embeddings based on the dataset associated with the plurality of entities. In some non-limiting embodiments or aspects, embedding analysis system 102 may generate the at least two embeddings based on the dataset associated with the plurality of entities using a machine learning algorithm. In some non-limiting embodiments or aspects, the machine learning algorithm may include Word2vec.

In some non-limiting embodiments or aspects, the plurality of embeddings may include embedding data associated with the plurality of embeddings, and the embedding data may include values of embedding vectors of the plurality of embeddings.

As shown in FIG. 3, at step 306, process 300 includes determining split criteria for partitioning an embedding space of at least one embedding tree. For example, embedding analysis system 102 may determine split criteria for partitioning an embedding space of at least one embedding tree.

In some non-limiting embodiments or aspects, the embedding space may include the embedding data associated with the plurality of embeddings. In some non-limiting embodiments or aspects, embedding analysis system 102 may determine a BIC score for a feature associated with a Gaussian mixture model under the embedding data. In some non-limiting embodiments or aspects, when determining the BIC score for a feature associated with a Gaussian mixture model under the embedding data, embedding analysis system 102 may, for each feature of the plurality of features for the entity, assign each feature having a value equal to 1 to a first group and assign each feature having a value equal to 0 to a second group, determine a measure of a prior probability distribution, a measure of a mean, and a measure of a standard deviation for each of the first group and the second group using a maximum likelihood estimation (MLE) function, and determine the BIC score based on the prior probability distribution, the measure of a mean, and the measure of a standard deviation for the first group and the prior probability distribution, the measure of a mean, and the measure of a standard deviation for the second group.

In some non-limiting embodiments or aspects, the split criteria may include a feature of a plurality of features (e.g., a plurality of features for an entity). In some non-limiting embodiments or aspects, embedding analysis system 102 may determine the feature of the plurality of features for partitioning the embedding space of the at least one embedding tree associated with the dataset.

As shown in FIG. 3, at step 308, process 300 includes generating at least one embedding tree. For example, embedding analysis system 102 may generate at least one embedding tree having a plurality of nodes based on the split criteria for partitioning an embedding space of the at least one embedding tree. In some non-limiting embodiments or aspects, embedding analysis system 102 may generate an embedding for an entity based on the at least one embedding tree. For example, embedding analysis system 102 may generate an embedding for a new entity that was not included in the plurality of entities associated with the dataset, based on the at least one embedding tree.

In some non-limiting embodiments or aspects, embedding analysis system 102 may perform an anomaly detection process. For example, embedding analysis system 102 may perform an anomaly detection process based on the at least one embedding tree. In some non-limiting embodiments or aspects, embedding analysis system 102 may calculate an anomaly score for an entity based on the anomaly detection process.

In some non-limiting embodiments or aspects, embedding analysis system 102 may display a graphical representation of the at least one embedding tree. In some non-limiting embodiments or aspects, the graphical representation may include a plurality of graphical user interface (GUI) elements associated with the plurality of nodes of the at least one embedding tree. In some non-limiting embodiments or aspects, each node of the at least one embedding tree may include a GUI element.

Referring now to FIGS. 4A-4H, shown are diagrams of non-limiting embodiments or aspects of an implementation of a process for analyzing features associated with entities using an embedding tree.

Figure 4A:
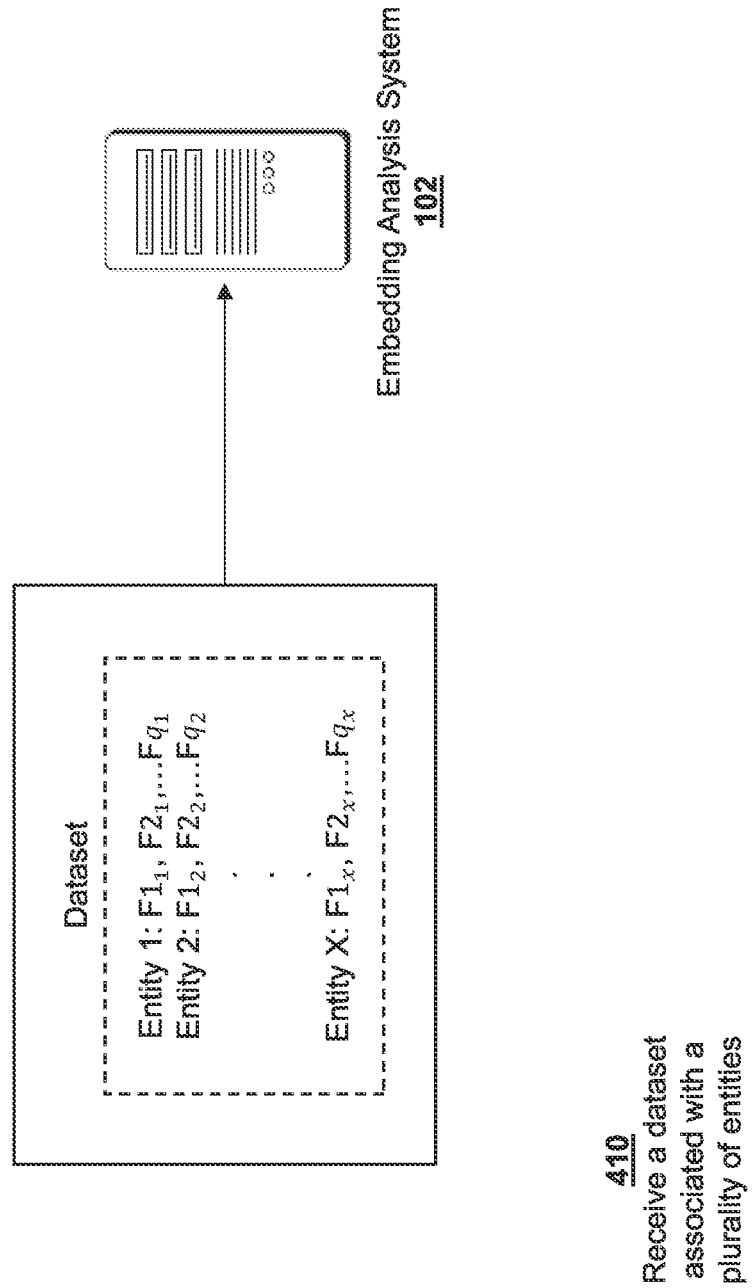
FIGS. 4A-4H are diagrams of non-limiting embodiments or aspects of an implementation of a process for analyzing features associated with entities using an embedding tree.

As shown in FIG. 4A, at step 410, embedding analysis system 102 may receive a dataset associated with a plurality of entities. For example, embedding analysis system 102 may receive a dataset from transaction service provider system 104. In some non-limiting embodiments or aspects, the dataset may include data associated with a plurality of merchants and/or a plurality of customers.

In some non-limiting embodiments or aspects, the dataset may include a plurality of data instances for a plurality of entities (e.g., Entity 1, Entity 2 . . . Entity X). In some non-limiting embodiments or aspects, an entity (e.g., a merchant) may have a unique and independent existence within the dataset. In some non-limiting embodiments or aspects, the plurality of entities may be associated with a plurality of merchants. For example, the dataset may include a plurality of data instances associated with a plurality of merchants.

In some non-limiting embodiments or aspects, the dataset may include a plurality of data instances for the plurality of entities. In some non-limiting embodiments or aspects, the plurality of data instances may be associated with a plurality of transactions. For example, the dataset may include a plurality of data instances associated with a plurality of transactions for the plurality of merchants.

In some non-limiting embodiments or aspects, each entity may have a plurality of features (e.g., features $F1_1, F2_1 \ldots Fq_1$ for Entity 1; features $F1_2, F2_2 \ldots Fq_2$ for Entity 2; and features $F1_x, F2_x \ldots Fq_x$ for Entity X). In some non-limiting embodiments or aspects, each data instance may include feature data associated with an entity (e.g., features $F1_1, F2_1 \ldots Fq_1$ associated with Entity 1). In some non-limiting embodiments or aspects, each data instance may include feature data (e.g., merchant location, merchant category code, number of transaction, etc.) associated with an entity.

In some non-limiting embodiments or aspects, embedding analysis system 102 may organize the dataset according to a Word2Vec method. For example, when organizing the dataset to apply a Word2Vec method, the data associated with the plurality of customers may be treated as a document and/or data associated with the plurality of merchants may be treated as a word. In some non-limiting embodiments or aspects, the data associated with the plurality of merchants may be grouped based on the data associated with the plurality of customers.

Figure 4B:
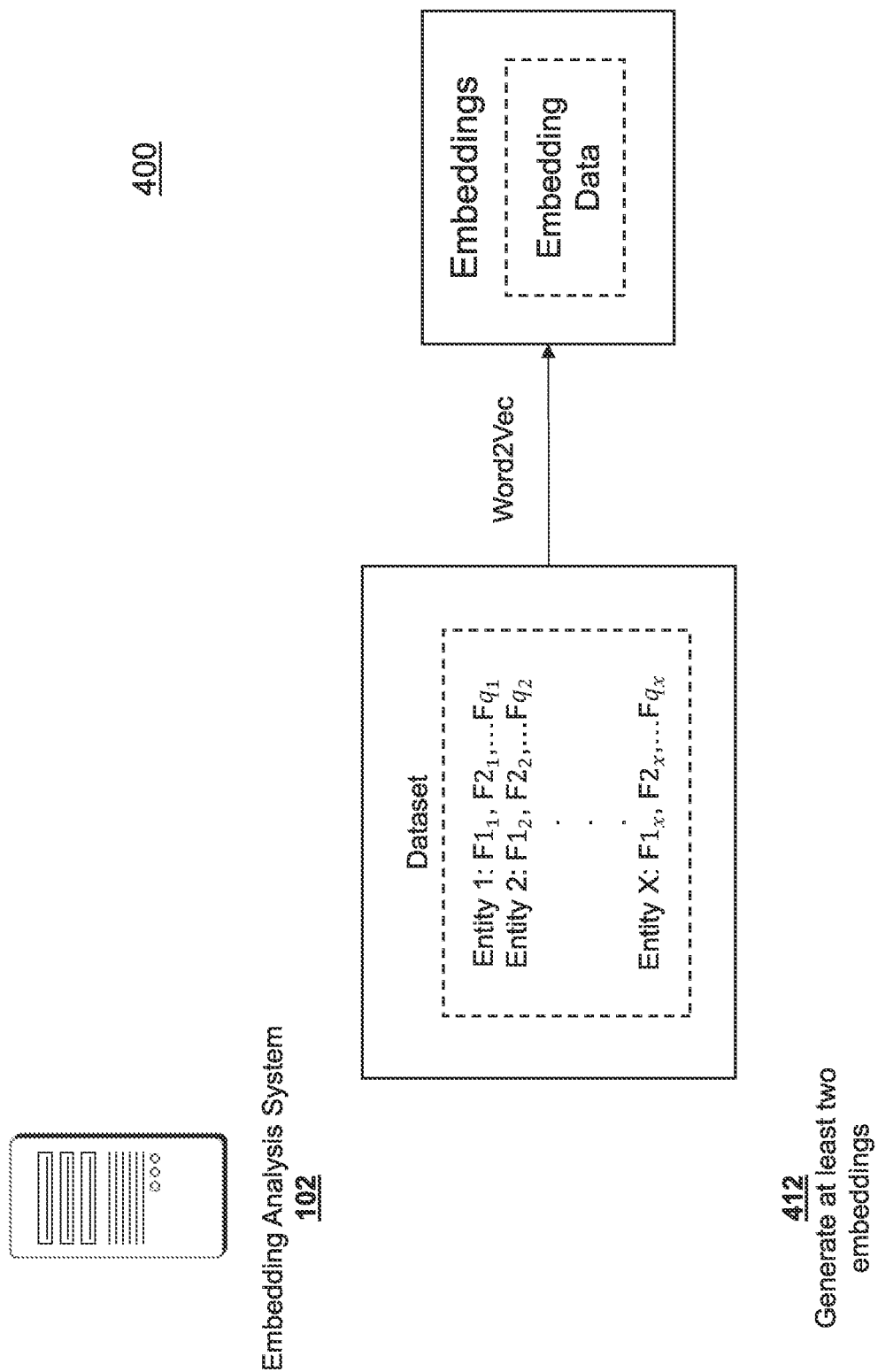

As shown in FIG. 4B, at step 412, embedding analysis system 102 may generate at least two embeddings. In some non-limiting embodiments or aspects, embedding analysis system 102 may generate the at least two embeddings based on a machine learning model. In some non-limiting embodiments or aspects, embedding analysis system 102 may generate at least two embeddings based on a Word2Vec machine learning algorithm. In some non-limiting embodiments or aspects, a model based on the Word2Vec machine learning algorithm may be the same as or similar to a continuous bag of words (CBOW) model.

In some non-limiting embodiments or aspects, the at least two embeddings may include embedding data associated with the at least two embeddings. In some non-limiting embodiments or aspects, the embedding data may include values of embedding vectors of the at least two embeddings.

In some non-limiting embodiments or aspects, embedding analysis system 102 may apply a principal component analysis (PCA) to the embedding data associated with the at least two embeddings to find the first eigenvector and project the at least two embeddings into a principal direction.

Figure 4C:
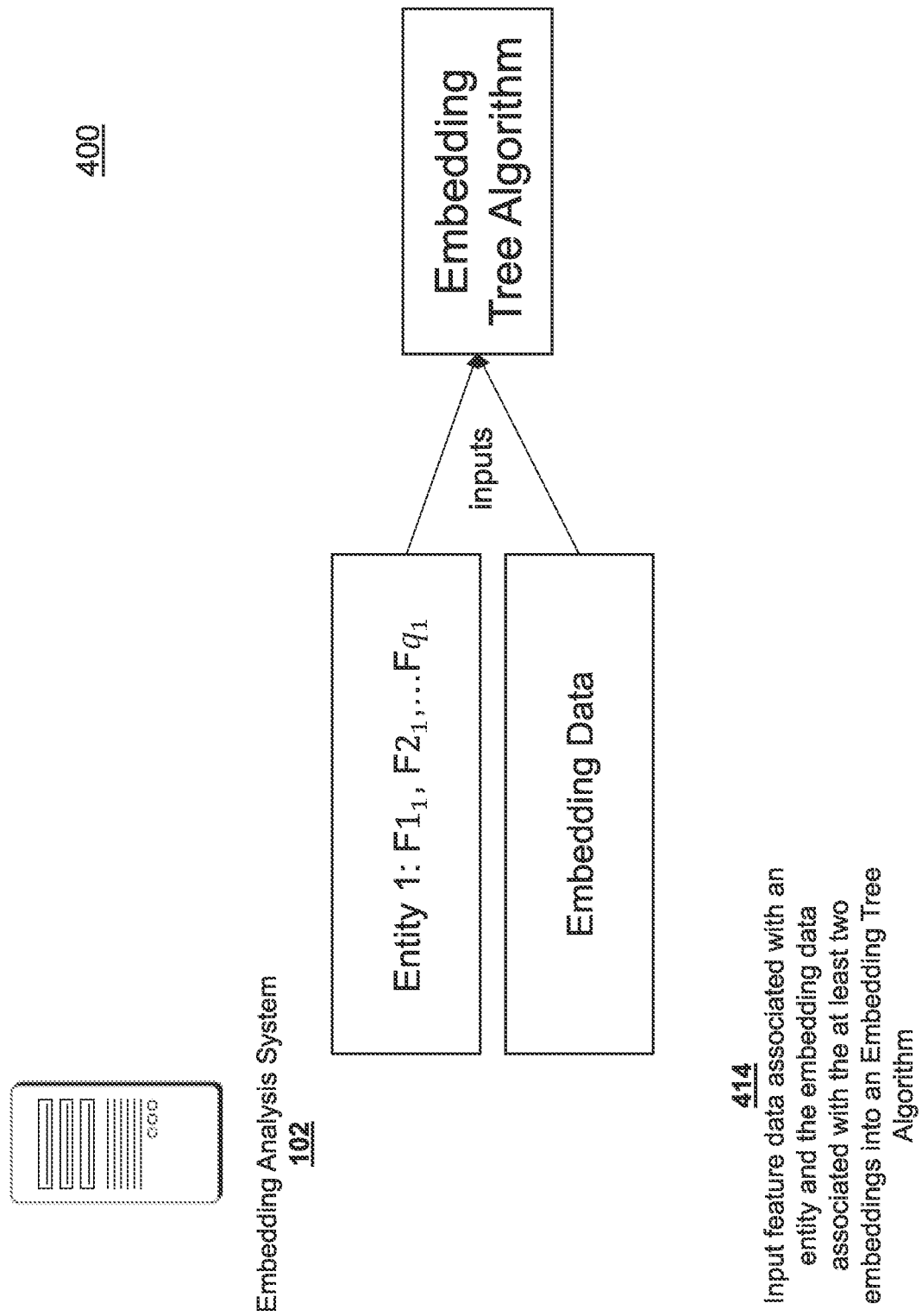

As shown in FIG. 4C, at step 414, embedding analysis system 102 may input feature data associated with an entity and/or embedding data associated with the at least two embeddings into an algorithm (e.g., embedding tree algorithm) for building an embedding tree. For example, embedding analysis system 102 may input feature data associated with an entity (e.g., Entity 1) and/or embedding data associated with the at least two embeddings into an algorithm to build an embedding tree.

In some non-limiting embodiments or aspects, embedding analysis system 102 may provide a subset of the dataset of a dimension, a dimensionality of the feature data, and/or a set of split legibility criteria, as inputs into the embedding tree algorithm.

Figure 4D:
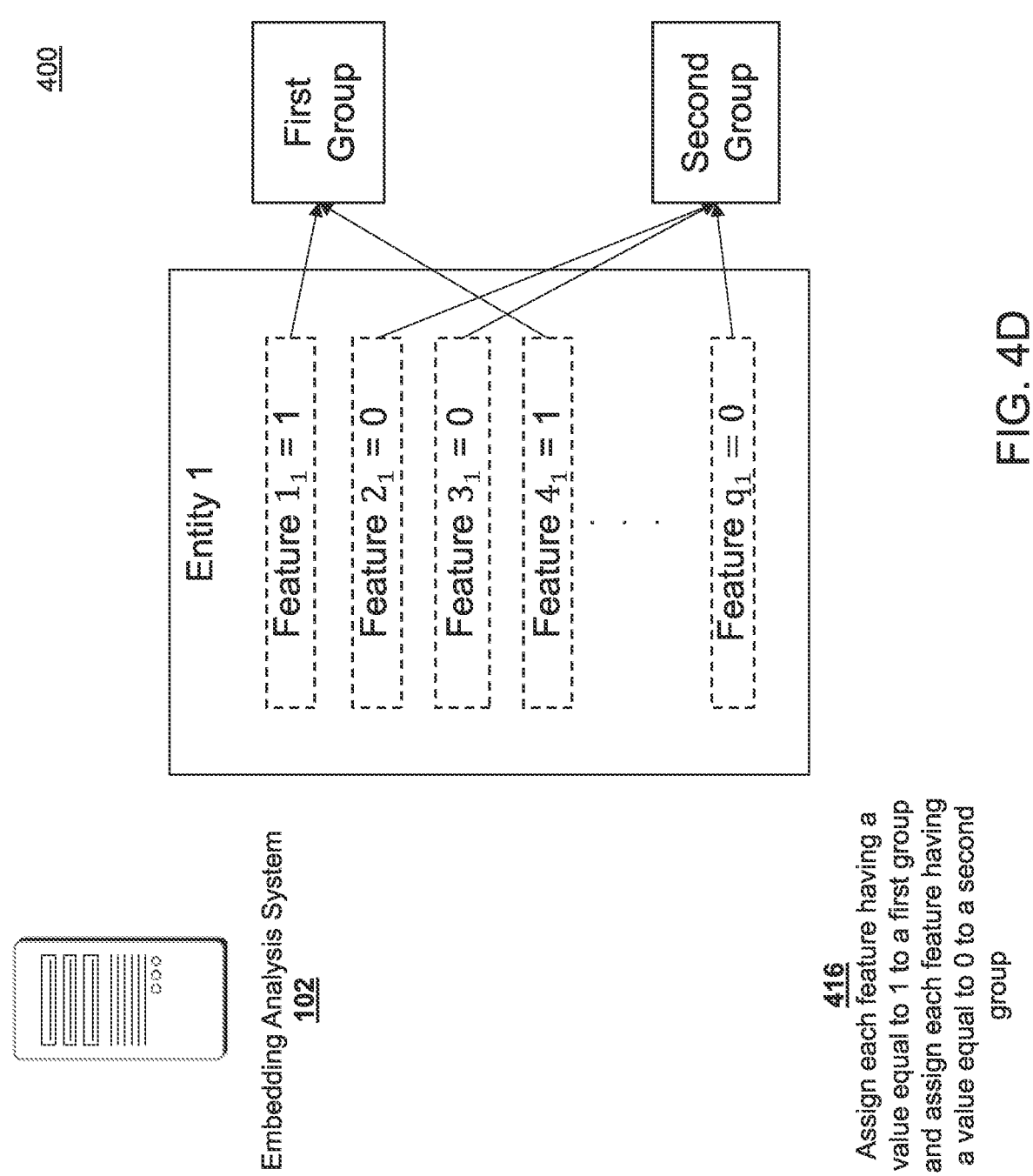

As shown in FIG. 4D, at step 416, embedding analysis system 102 may assign each feature having a value equal to 1 to a fist group and/or assign each feature having a value equal to 0 to a second group. For example, for each feature of the plurality of features for the entity (e.g., Entity 1) embedding analysis system 102 may assign each feature having a value of 1 (e.g., Feature $1_1$, Feature $4_1$) to a first group and each feature having a value of 0 (e.g., Feature $2_1$, Feature $3_1$, Feature $q_1$) to a second group.

In some non-limiting embodiments or aspects, each feature having a value of 1 may be assigned to a first Gaussian group, and each feature having a value of 0 may be assigned to a second Gaussian group of a Gaussian Mixture Model.

In some non-limiting embodiments or aspects, embedding analysis system 102 may split a parent node into two child nodes. For example, embedding analysis system 102 may spilt a parent node into two child nodes continuously until a termination specification is met. In some non-limiting embodiments or aspects, each feature of the plurality of entities may split the embedding data associated with the at least two embeddings into two parts. In some non-limiting embodiments or aspects, each feature may be evaluated based on a split legibility criteria to determine an optimal split (e.g., the best split feature), which may be selected to split the embedding data into two child nodes.

In some non-limiting embodiments or aspects, embedding analysis system 102 may check all features of the plurality of features to determine an optimal split. In some non-limiting embodiments or aspects, embedding analysis system 102 may select a first feature of the plurality of features. In some non-limiting embodiments or aspects, embedding analysis system 102 may determine whether the first feature satisfies the split legibility criteria. For example, embedding analysis system 102 may assign the first feature to either a first group or a second group based on whether or not the first feature satisfies the split legibility criteria.

In some non-limiting embodiments or aspects, if the first feature does not satisfy the split legibility criteria, then the embedding tree algorithm may return a leaf (e.g., a node of the embedding tree). In some non-limiting embodiments or aspects, if the first feature satisfies the split legibility criteria, then embedding analysis system 102 may determine the optimal split for the first feature.

In some non-limiting embodiments or aspects, embedding analysis system 102 may select a second feature. In some non-limiting embodiments or aspects, embedding analysis system 102 may check all remaining features of the plurality of features, excluding the first feature, to determine if the second feature satisfies the split legibility criteria.

In some non-limiting embodiments or aspects, if the second feature does not satisfy the split legibility criteria, then the embedding tree algorithm may return a leaf (e.g., a node of the embedding tree). In some non-limiting embodiments or aspects, if the second feature satisfies the split legibility criteria, then embedding analysis system 102 may determine the optimal split for the second feature.

In some non-limiting embodiments or aspects, embedding analysis system 102 may select a third feature. In some non-limiting embodiments or aspects, embedding analysis system may check all remaining features of the plurality of features, excluding the first feature and the second feature, to determine whether the third feature satisfies the split legibility criteria.

In some non-limiting embodiments or aspects, if the third feature does not satisfy the split legibility criteria, then the embedding tree algorithm may return a leaf (e.g., a node of the embedding tree). In some non-limiting embodiments or aspects, if the third feature satisfies the split legibility criteria, then embedding analysis system 102 may determine the optimal split for the third feature.

In some non-limiting embodiments or aspects, to determine the optimal split, an algorithm may be used to compute an approximate BIC for Gaussian Mixture Model. In some non-limiting embodiments or aspects, the algorithm may combine each entity's features and embeddings to split the embedding space.

Figure 4E:
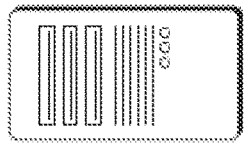

As shown in FIG. 4E, at step 418, when determining the BIC score for a feature associated with the Gaussian Mixture Model under the embedding data, embedding analysis system 102 may determine, for each of the first group and the second group, one or more maximum likely estimate (MLE) values. In some non-limiting embodiments or aspects, the MLE values may include, a measure of a prior probability distribution, $\hat{\omega}$, a measure of a mean, $\hat{u}$, and a measure of a standard deviation, $\hat{\sigma}$. In some non-limiting embodiments or aspects, embedding analysis system 102 may determine, for each of the first group and the second group, a measure of a prior probability distribution, $\hat{\omega}$, a measure of a mean, $\hat{u}$, and/or a measure of a standard deviation, $\hat{\sigma}$. In some non-limiting embodiments or aspects, embedding analysis system 102 may determine a measure of a prior probability distribution, $\hat{\omega}$, a measure of a mean, $\hat{u}$, and a measure of a standard deviation, $\hat{\sigma}$, for the first group (e.g., cluster where j=1). In some non-limiting embodiments or aspects, embedding analysis system 102 may determine a measure of a prior probability distribution, $\hat{\omega}$, a measure of a mean, $\hat{u}$, and a measure of a standard deviation, $\hat{\sigma}$, for the second group (e.g., cluster where j=2).

In some non-limiting embodiments or aspects, for each feature of the plurality of features for the entity (e.g., Entity 1), embedding analysis system 102 may determine for each of the first group (e.g., Feature $1_1$, Feature $4_1$) and the second group (e.g., Feature $2_1$, Feature $3_1$, Feature $q_1$), a measure of a prior probability distribution, $\hat{\omega}$, based on the following equation, where the first embedding is denoted by s and where the total number of embeddings is denoted by N:

$$\hat{w} = \frac{s}{N}$$

In some non-limiting embodiments or aspects, for each feature of the plurality of features for the entity (e.g., Entity 1), embedding analysis system 102 may determine for each of the first group and the second group, a measure of a mean, $\hat{u}$, based on the following equation, where the first embedding, denoted by s, includes data points $x_i$ and may have a feature value, $f_i$, equal to 0:

$$\hat{u} = \frac{1}{s} \sum_{f_i=0} x_i,$$

In some non-limiting embodiments or aspects, for each feature of the plurality of features for the entity (e.g., Entity 1), embedding analysis system 102 may determine for each of the first group and the second group, a measure of a standard deviation, $\hat{\sigma}$, based on the following equation:

$$\hat{\sigma} = \frac{1}{s} \sum_{f_i=0} \|x_i - \hat{u}\|^2$$

In some non-limiting embodiments or aspects, for the first group (e.g., j=1) and/or the second group (e.g., j=2), the first embedding, s, may have a feature value, $f_i=0$, and the remaining embeddings, N−s, have a feature value, $f_i=1$. In some non-limiting embodiments or aspects, a z value such as, $z_{n,j}$, may be an indicator that data point, $x_n$, is in the first group j=1 and/or the second group j=2.

In some non-limiting embodiments or aspects, embedding analysis system 102 may perform a hard clustering, as in two-means. In some non-limiting embodiments or aspects, if data point, $x_i$ is in group j, then $z_{i,j}=1$ and $z_{i,j'}=0$ for all j≠j'.

Figure 4F:
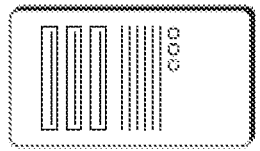

As shown in FIG. 4F, at step 420, embedding analysis system 102 may determine the log likelihood (e.g., the likelihood that a feature is the best split feature), $\hat{L}_s$, for an embedding, s.

In some non-limiting embodiments or aspects, the likelihood, $\hat{L}_s$, may be obtained by summing over the z values according to the following equation:

$$P(x, \mu, \sigma, w) = \sum_z \prod_{i=1}^{N} \prod_{j=1}^{J} \{w_j \mathcal{N}(x_n; \mu_j, \sigma_j^2)\}^{z_{i,j}}$$

Nothing that, $z_{i,j}=0$ and $$z_{(i \in (0,s], j=1)} = z_{(i \in [s+1, N), j=2)} = 1$$

In some non-limiting embodiments or aspects, the equation for finding the likelihood, $\hat{L}_s$, may be simplified as follows:

$$P(x, \mu, \sigma, w) = \prod_{i=1}^{s} w_1 \mathcal{N}(x_i; \hat{\mu}_1, \sigma_1^2) \prod_{i=s+1}^{N} w_2 \mathcal{N}(x_i; \hat{\mu}_2, \sigma_2^2)$$

In some non-limiting embodiments or aspects, embedding analysis system 102 may plug in the MLE values for the parameters to determine the maximum log likelihood function, L=log P (x, μ, σ, ω), where $\hat{\mu}=\hat{u}$, using the following equation:

$$\hat{L} = \sum_{i=1}^{s}[\log\hat{w}_1 + \log\mathcal{N}(x_i; \hat{\mu}_1, \hat{\sigma}_1^2)] + \prod_{i=s+1}^{N}[\log\hat{w}_2 + \log\mathcal{N}(x_i; \hat{\mu}_2, \hat{\sigma}_2^2)]$$

In some non-limiting embodiments or aspects, the equation may be simplified to drop terms that are not functions of the parameters as follows:

$-2\hat{L}_s = s \log 2\hat{\omega}_1\hat{\sigma}_1^2 + (N-s)\log 2\hat{\omega}_2\hat{\sigma}_2^2 - s \log \hat{\mu}_1 - (N-s)\log \hat{\mu}_2$ In some non-limiting embodiments or aspects, for each feature of the plurality of features for the entity (e.g., Entity 1), embedding analysis system 102 may determine the BIC score based on the measure of a prior probability distribution of the first group, $\hat{\omega}_1$, the measure of a mean of the first group, $\hat{u}_1$, the measure of a standard deviation of the first group, $\hat{\sigma}_1$, the measure of a prior probability distribution of the second group, $\hat{\omega}_2$, the measure of a mean of the second group, $\hat{u}_2$, and the measure of a standard deviation of the second group, $\hat{\sigma}_2$, by further simplifying the log likelihood function as follows:

$$\hat{L}_s = -\frac{s}{2}\log 2\hat{w}_1\hat{\sigma}_1^2 - \frac{N-s}{2}\log 2\hat{w}_2\hat{\sigma}_2^2 + s\log\hat{w}_1 + (N-s)\log\hat{w}_2.$$

Figure 4G:
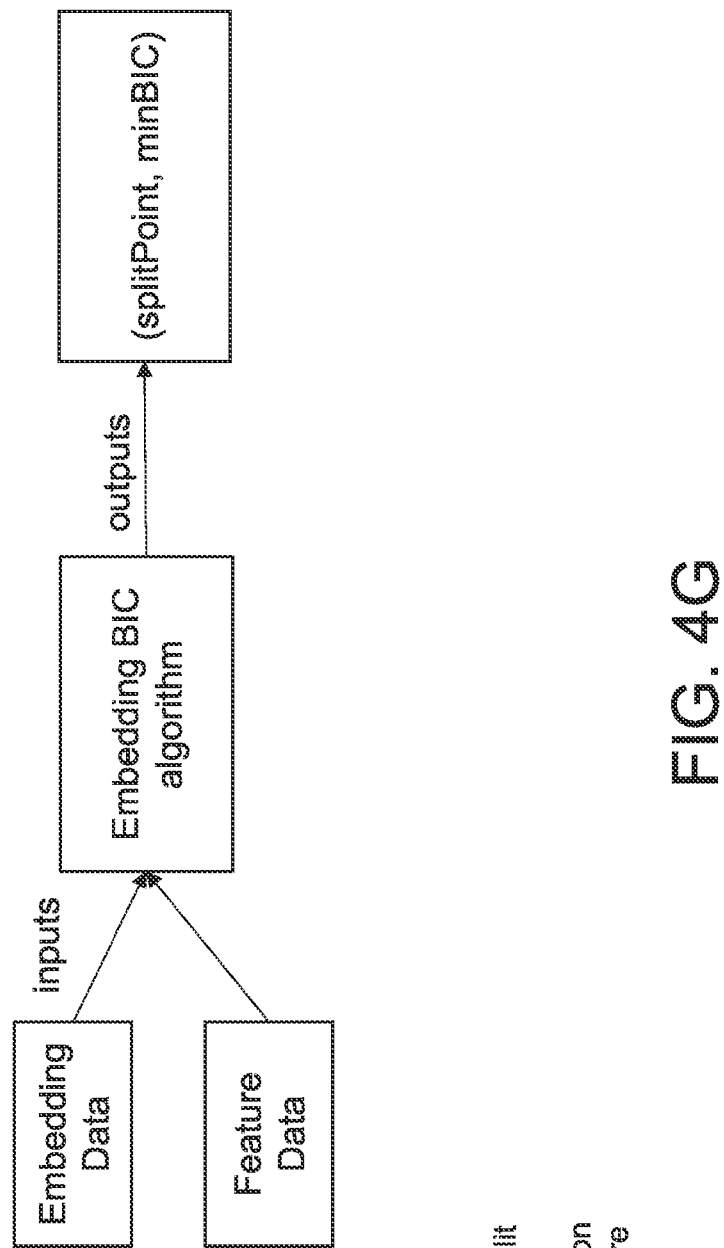

As shown in FIG. 4G, at step 422, embedding analysis system 102 may find the optimal split in terms of the BIC score. For example, embedding analysis system 102 may input the embedding data and the feature data into an embedding BIC algorithm to find the optimal split in terms of the BIC score. In some non-limiting embodiments or aspects, the BIC algorithm may be used to determine the dimension and split-point that maximizes the value of $\hat{L}_s$.

In some non-limiting embodiments or aspects, embedding analysis system 102 may input embedding data, $X \in R^P$, and/or feature data, $F \in \{0,1\}^q$, into the embedding BIC algorithm. In some non-limiting embodiments or aspects, the embedding BIC algorithm may output a midpoint and/or a BIC score that correspond to a partition of input, X, based on the midpoint.

In some non-limiting embodiments or aspects, embedding analysis system 102 may use the embedding BIC algorithm to determine a midpoint and/or a BIC score for each feature of a plurality of features, k, ranging from 1 to q, for the first group j=1 and/or the second group j=2.

In some non-limiting embodiments or aspects, the BIC score may be determined based on the MLE parameters $\hat{\omega}_1$, $\hat{\mu}_1$, and $\hat{\sigma}_1$ for the first group j=1 and/or the MLE parameters $\hat{\omega}_2$, $\hat{\mu}_2$, and $\hat{\sigma}_2$ for second group j=2.

Figure 4H:
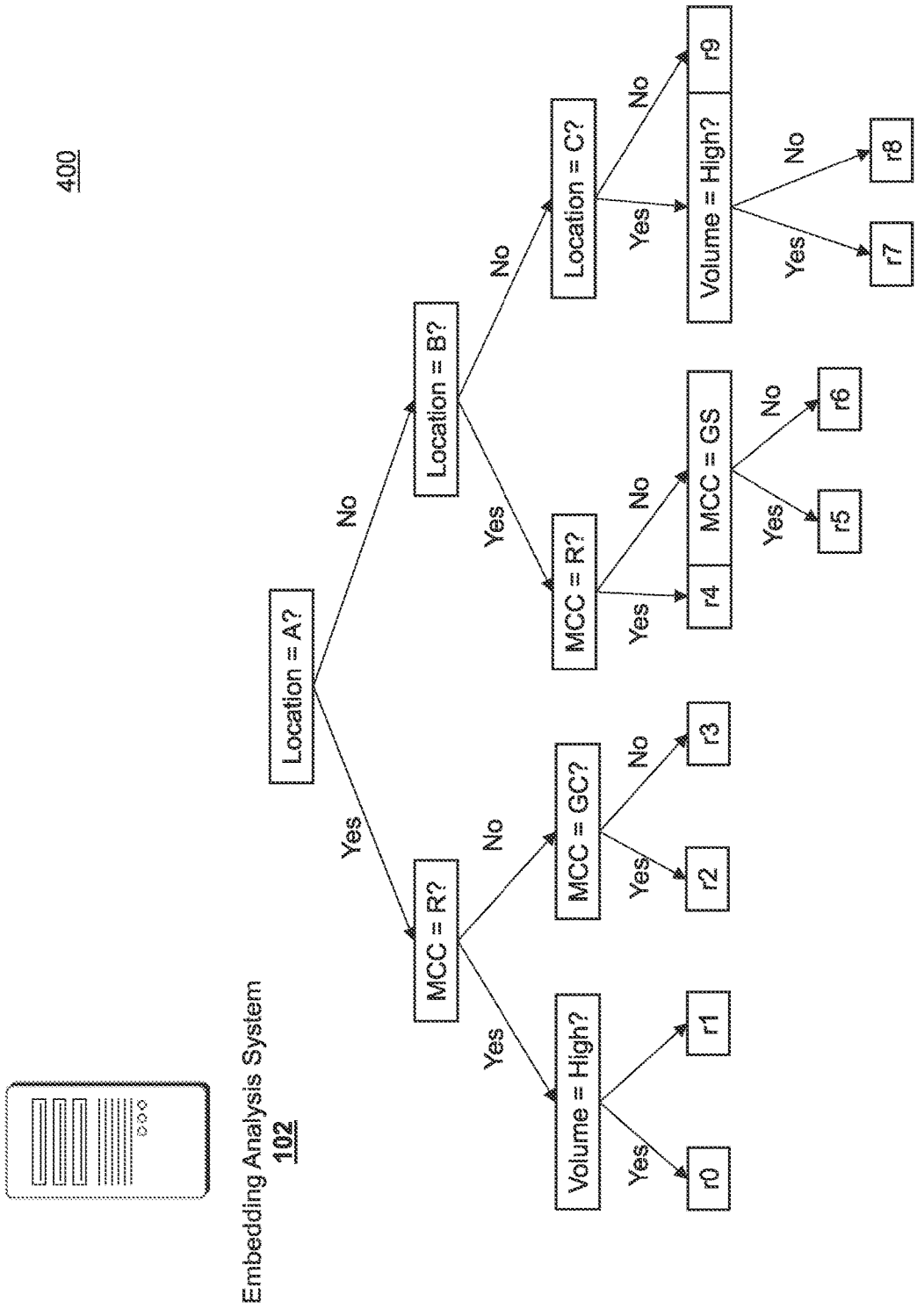

As shown in FIG. 4H, at step 424, embedding analysis system 102 may generate at least one embedding tree. In some non-limiting embodiments or aspects, embedding analysis system 102 may generate an embedding for a first entity based on the at least one embedding tree.

In some non-limiting embodiments or aspects, the at least one embedding tree may include a plurality of nodes and/or a plurality of branches. In some non-limiting embodiments or aspects, the plurality of nodes (e.g., leaves) may be associated with a plurality of features. In some non-limiting embodiments or aspects, one or more of the plurality of branches may connect one or more of the plurality of nodes.

In some non-limiting embodiments or aspects, the plurality of branches may connect a parent node to at least two respective child nodes.

In some non-limiting embodiments or aspects, embedding analysis system 102 may perform an anomaly detection process based on the embedding tree. In some non-limiting embodiments or aspects, embedding analysis system 102 may automatically generate and/or transmit a communication (e.g., alert, message, and/or the like) based on the anomaly detection process. For example, if an anomaly is detected, embedding analysis system 102 may automatically generate and/or transmit a communication to transaction service provider system 104 and/or user device 106 via communication network 108.

Figure 5:
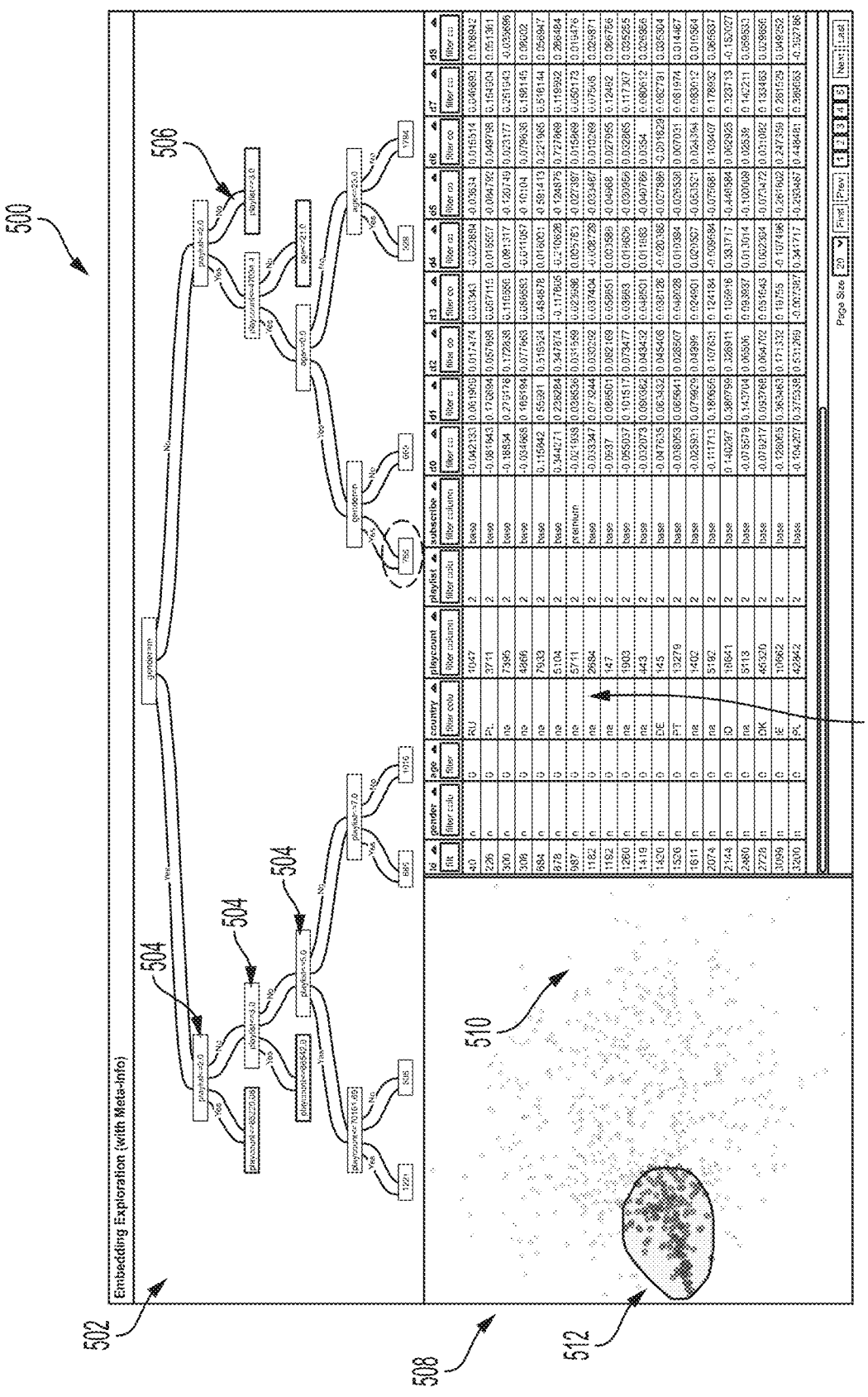
FIG. 5 is an exemplary diagram of a graphical representation for analyzing features associated with entities using an embedding tree.

Referring now to FIG. 5, shown is an exemplary diagram of a graphical representation 500 for analyzing features associated with entities using an embedding tree. In some non-limiting embodiments or aspects, embedding analysis system 102 may generate and display a graphical representation 500 of the at least one embedding tree. In some non-limiting embodiments or aspects, the graphical representation may include a plurality of GUI elements associated with the plurality of nodes of the at least one embedding tree. In some non-limiting embodiments or aspects, each node of the at least one embedding tree may include a GUI element.

In some non-limiting embodiments or aspects, embedding analysis system 102 may display data associated with an embedding tree via graphical representation 500. In some non-limiting embodiments or aspects, graphical representation 500 may include a GUI comprising a plurality of GUI elements. In some non-limiting embodiments or aspects, the GUI may be an interactive GUI. For example, the interactive GUI may be configured to receive an input and/or selection from a user. In some non-limiting embodiments or aspects, the GUI may be configured to be updated based on the input and/or selection received from the user.

In some non-limiting embodiments or aspects, graphical representation 500 may include tree view 502. For example, embedding analysis system 102 may, via graphical representation 500, display data associated with a selected embedding tree in tree view 502 via the interactive GUI. In some non-limiting embodiments or aspects, tree view 502 may include a plurality of nodes 504. In some non-limiting embodiments or aspects, the plurality of nodes 504 may be determined based on the split criteria for partitioning the embedding space of the embedding tree. In some non-limiting embodiments or aspects, each node of the plurality of nodes 504 may indicate a splitting condition for each respective node of the plurality of nodes 504.

In some non-limiting embodiments or aspects, tree view 502 may include a plurality of branches 506. For example, tree view 502 may illustrate a structure of a selected tree and/or a distribution of data distributions across different branches of the plurality of branches 506. In some non-limiting embodiments or aspects, one or more branches of the plurality of branches 506 may connect one or more nodes of the plurality of nodes 504. For example, one or more branches of the plurality of branches 506 may connect one or more nodes of the plurality of nodes 504 based on the splitting condition of the one or more nodes of the plurality of nodes 504. In some non-limiting embodiments or aspects, a width of a branch of the plurality of branches 506 may indicate a volume of entities represented by the branch of the plurality of branches 506.

In some non-limiting embodiments or aspects, graphical representation 500 may include dimensionality reduction view 508. For example, embedding analysis system 102 may display, via graphical representation 500, data associated with a selected embedding tree in dimensionality reduction view 508 via the interactive GUI. In some non-limiting embodiments or aspects, graphical representation 500 may generate a two-dimensional visualization of a selected embedding using a dimensionality reduction algorithm (e.g., t-distributed stochastic neighbor embedding (t-SNE), PCA, Uniform Manifold Approximation and Projection (UMAP), and/or the like). In some non-limiting embodiments or aspects, dimensionality reduction view 508 may include entities 510 from a selected node 504 of the plurality of nodes 504.

In some non-limiting embodiments or aspects, dimensionality reduction view 508 may include cluster(s) 512. For example, dimensionality reduction view 508 may display cluster(s) 512 based on a feature selection. In some non-limiting embodiments or aspects, cluster(s) 512 may include a subset of the plurality of entities 510. In some non-limiting embodiments or aspects, cluster(s) 512 may indicate an anomaly in the dataset.

In some non-limiting embodiments or aspects, graphical representation 500 may include data table view 514. For example, embedding analysis system 102 may display, via graphical representation 500, data associated with a selected embedding tree in data table view 514 via the interactive GUI. In some non-limiting embodiments or aspects, data table view 514 may display a plurality of data features (e.g., raw data) associated with the plurality of entities via the interactive GUI in a two-dimensional table. In some non-limiting embodiments or aspects, data table view 514 may include data features, such as merchant ID, merchant category code, city code, number of transactions, etc., of a selected data entity.

Although the present disclosure has been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for analyzing features associated with entities using an embedding tree, the system comprising:
at least one processor programmed or configured to:
receive a dataset associated with a plurality of entities, wherein the dataset comprises a plurality of data instances for the plurality of entities, wherein each data instance of the plurality of data instances comprises feature data associated with an entity of the plurality of entities, and wherein the feature data comprises a plurality of feature values of a plurality of features for the entity;
generate at least two embeddings based on the dataset associated with the plurality of entities, wherein the at least two embeddings comprise embedding data associated with the at least two embeddings, and wherein the embedding data comprises values of embedding vectors of the at least two embeddings;
determine split criteria that partitions an embedding space of at least one embedding tree associated with the dataset based on the feature data associated with an entity and the embedding data associated with the at least two embeddings; and
generate the at least one embedding tree having a plurality of nodes by splitting the embedding space based on the split criteria.

2. The system of claim 1, wherein the at least one processor is further programmed or configured to:
perform an anomaly detection process based on the embedding tree.

3. The system of claim 1, wherein the at least one processor is further programmed or configured to:
generate an embedding for a first entity based on the at least one embedding tree.

4. The system of claim 1, wherein, when determining the split criteria that partitions the embedding space of the at least one embedding tree associated with the dataset, the at least one processor is programmed or configured to:
determine a Bayesian Information Criterion (BIC) score for a feature associated with a Gaussian mixture model under the embedding data.

5. The system of claim 4, wherein, when determining the BIC score for the feature associated with the Gaussian mixture model under the embedding data, the at least one processor is programmed or configured to:
for each feature of the plurality of features for the entity:
assign each feature having a value equal to 1 to a first group and assign each feature having a value equal to 0 to a second group;
determine a measure of a prior probability distribution, a measure of a mean, and a measure of a standard deviation for each of the first group and the second group using a maximum likelihood estimation (MLE) function; and
determine the BIC score based on the prior probability distribution, the measure of a mean, and the measure of a standard deviation for the first group and the prior probability distribution, the measure of a mean, and the measure of a standard deviation for the second group.

6. The system of claim 1, wherein the at least one processor is further programmed or configured to:
display a graphical representation of the at least one embedding tree, wherein the graphical representation comprises a plurality of graphical user interface (GUI) elements associated with the plurality of nodes of the at least one embedding tree, and wherein each node of the at least one embedding tree comprises a GUI element.

7. The system of claim 5, wherein the split criteria comprises a feature of the plurality of features, and wherein, when determining the split criteria that partitions the embedding space of the at least one embedding tree associated with the dataset, the at least one processor is programmed or configured to:
determine the feature of the plurality of features that partitions the embedding space of the at least one embedding tree associated with the dataset.

8. A method for analyzing features associated with entities using an embedding tree, the method comprising:
receiving, by at least one processor, a dataset associated with a plurality of entities, wherein the dataset comprises a plurality of data instances for the plurality of entities, wherein each data instance of the plurality of data instances comprises feature data associated with an entity of the plurality of entities, and wherein the feature data comprises a plurality of feature values of a plurality of features for the entity;

generating, by the at least one processor, at least two embeddings based on the dataset associated with the plurality of entities, wherein the at least two embeddings comprise embedding data associated with the at least two embeddings, and wherein the embedding data comprises values of embedding vectors of the at least two embeddings;

determining, by the at least one processor, split criteria that partitions an embedding space of at least one embedding tree associated with the dataset based on the feature data associated with the entity and the embedding data associated with the at least two embeddings; and generating, by the at least one processor, the at least one embedding tree having a plurality of nodes by splitting the embedding space based on the split criteria.

9. The method of claim 8, further comprising:
performing, by the at least one processor, an anomaly detection process based on the embedding tree.

10. The method of claim 8, further comprising:
generating, by the at least one processor, an embedding for a first entity based on the at least one embedding tree.

11. The method of claim 8, wherein determining the split criteria that partitions the embedding space of the at least one embedding tree associated with the dataset comprises:
determining a Bayesian Information Criterion (BIC) score for a feature associated with a Gaussian mixture model under the embedding data.

12. The method of claim 11, wherein determining the BIC score for the feature associated with the Gaussian mixture model under the embedding data comprises:
for each feature of the plurality of features for the entity:
assigning each feature having a value equal to 1 to a first group and assigning each feature having a value equal to 0 to a second group;
determining a measure of a prior probability distribution, a measure of a mean, and a measure of a standard deviation for each of the first group and the second group using a maximum likelihood estimation (MLE) function; and
determining the BIC score based on the prior probability distribution, the measure of a mean, and the measure of a standard deviation for the first group and the prior probability distribution, the measure of a mean, and the measure of a standard deviation for the second group.

13. The method of claim 8, further comprising:
displaying, by the at least one processor, a graphical representation of the at least one embedding tree, wherein the graphical representation comprises a plurality of graphical user interface (GUI) elements associated with the plurality of nodes of the at least one embedding tree, and wherein each node of the at least one embedding tree comprises a GUI element.

14. The method of claim 12, wherein the split criteria comprises a feature of the plurality of features, and wherein determining the split criteria that partitions the embedding space of the at least one embedding tree associated with the dataset comprises:
determining the feature of the plurality of features that partitions the embedding space of the at least one embedding tree associated with the dataset.

15. A computer program product for analyzing features associated with entities using an embedding tree, the computer program product comprising at least one non-transitory computer-readable medium including one or more instructions that, when executed by at least one processor, cause the at least one processor to:
receive a dataset associated with a plurality of entities, wherein the dataset comprises a plurality of data instances for the plurality of entities, wherein each data instance of the plurality of data instances comprises feature data associated with an entity of the plurality of entities, and wherein the feature data comprises a plurality of feature values of a plurality of features for the entity of the plurality of entities;
generate at least two embeddings based on the dataset associated with the plurality of entities, wherein the at least two embeddings comprise embedding data associated with the at least two embeddings, and wherein the embedding data comprises values of embedding vectors of the at least two embeddings;
determine split criteria that partitions an embedding space of at least one embedding tree associated with the dataset based on the feature data associated with the entity and the embedding data associated with the at least two embeddings; and
generate the at least one embedding tree having a plurality of nodes by splitting the embedding space based on the split criteria.

16. The computer program product of claim 15, wherein the one or more instructions cause the at least one processor to:
perform an anomaly detection process based on the embedding tree.

17. The computer program product of claim 15, wherein the one or more instructions cause the at least one processor to:
generate an embedding for a first entity based on the at least one embedding tree.

18. The computer program product of claim 15, wherein, when determining the split criteria that partitions the embedding space of the at least one embedding tree associated with the dataset, the one or more instructions cause the at least one processor to:
determine a Bayesian Information Criterion (BIC) score for a feature associated with a Gaussian mixture model under the embedding data.

19. The computer program product of claim 18, wherein, when determining the BIC score for the feature associated with the Gaussian mixture model under the embedding data, the one or more instructions cause the at least one processor to:
for each feature of the plurality of features for the entity:
assign each feature having a value equal to 1 to a first group and assign each feature having a value equal to 0 to a second group;
determine a measure of a prior probability distribution, a measure of a mean, and a measure of a standard deviation for each of the first group and the second group using a maximum likelihood estimation (MLE) function; and
determine the BIC score based on the prior probability distribution, the measure of a mean, and the measure of a standard deviation for the first group and the prior probability distribution, the measure of a mean, and the measure of a standard deviation for the second group;
wherein the split criteria comprises a feature of the plurality of features, and wherein, when determining the split criteria for partitioning the embedding space of the at least one embedding tree associated with the dataset, the one or more instructions cause the at least one processor to:
    determine the feature of the plurality of features for partitioning the embedding space of the at least one embedding tree associated with the dataset.

20. The computer program product of claim 15, wherein the one or more instructions further cause the at least one processor to:
    display a graphical representation of the at least one embedding tree, wherein the graphical representation comprises a plurality of graphical user interface (GUI) elements associated with the plurality of nodes of the at least one embedding tree, and wherein each node of the at least one embedding tree comprises a GUI element.

* * * * *